(12) United States Patent
Cunningham et al.

(10) Patent No.: US 7,191,650 B2
(45) Date of Patent: Mar. 20, 2007

(54) WHEEL BALANCER WITH CONTINUOUS STATIC IMBALANCE DISPLAY

(75) Inventors: Charles L. Cunningham, Nashville, TN (US); Carlo Buzzi, Mandello del Lario (IT)

(73) Assignee: Hennessy Industries, Inc., LaVergne, TN (US)

( * ) Notice: Subject to any disclaimer, the term of this patent is extended or adjusted under 35 U.S.C. 154(b) by 0 days.

(21) Appl. No.: 10/770,847

(22) Filed: Feb. 3, 2004

(65) Prior Publication Data

US 2005/0011262 A1    Jan. 20, 2005

Related U.S. Application Data

(60) Provisional application No. 60/448,162, filed on Feb. 18, 2003.

(51) Int. Cl.
*G01M 1/38* (2006.01)
*G01M 1/08* (2006.01)

(52) U.S. Cl. .......................... 73/462; 73/468; 201/5.21
(58) Field of Classification Search .......... 73/458–462, 73/466–470; 702/56; 301/5.21, 5.22
See application file for complete search history.

(56) References Cited

U.S. PATENT DOCUMENTS

| 4,302,966 | A | * | 12/1981 | Ohnishi et al. | ................ 73/66 |
| 4,817,429 | A | * | 4/1989 | Goebel | ........................ 73/459 |
| 4,891,981 | A | * | 1/1990 | Schonfeld | ..................... 73/460 |
| 4,958,290 | A | * | 9/1990 | Kendall et al. | ................ 73/460 |
| 5,311,777 | A | | 5/1994 | Cunningham et al. | |
| 5,337,256 | A | | 8/1994 | Cunningham et al. | |
| 5,355,729 | A | * | 10/1994 | Douglas | ....................... 73/468 |
| 5,396,436 | A | * | 3/1995 | Parker et al. | ............... 700/279 |
| 5,915,274 | A | * | 6/1999 | Douglas | ....................... 73/462 |
| 5,983,717 | A | * | 11/1999 | Diez | ........................... 73/462 |
| 6,484,574 | B1 | * | 11/2002 | Douglas et al. | ............... 73/462 |
| 6,952,964 | B2 | * | 10/2005 | Gerdes et al. | ................ 73/462 |

* cited by examiner

*Primary Examiner*—Helen Kwok
(74) *Attorney, Agent, or Firm*—Nelson Mullins Riley & Scarborough LLP

(57) ABSTRACT

An apparatus for balancing a vehicle wheel simultaneously shows both dynamic imbalance and static imbalance. At least one corrective weight is attached to the wheel to correct the static imbalance. A residual static imbalance is then determined after attachment of the corrective weight. Finally, the corrective weight is adjusted to reduce the residual static imbalance.

9 Claims, 5 Drawing Sheets

WHEEL BALANCER WITH CONTINUOUS STATIC IMBALANCE DISPLAY

PRIORITY CLAIM

This application claims the benefit of provisional application Ser. No. 60/448,162, filed Feb. 18, 2003, which is relied upon and incorporated herein by reference.

BACKGROUND OF THE INVENTION

The present invention relates generally to motor vehicle wheel balancing equipment. In particular, the present invention relates to a wheel balancer which continuously displays static imbalance while in the dynamic balancing mode.

It is well known that a vehicle wheel should be balanced prior to installation in order to improve ride quality and tire longevity. Two types of imbalance may be exhibited by the wheel: static imbalance and dynamic imbalance. Explained in terms of the reaction transmitted to the vehicle operator, static imbalance will cause the wheel to hop up and down as the vehicle is driven. This is very irritating to occupants of the vehicle, and only a small amount of static imbalance will become a noticeable vibration as the speed of the vehicle is increased.

Dynamic imbalance is a situation where the reaction by the rotating wheel is a wobble. A vehicle operator will feel this type of imbalance as a back and forth of the steering wheel from the front wheels, or as a seat shake left to right from the rear wheels. As a basic engineering fact, a tire and wheel that is perfectly dynamically balanced is statically balanced. However, a tire and wheel that is perfectly statically balanced is not necessarily dynamically balanced.

Originally, the only balancing systems available to the vehicle service industry were static-type bubble balancers. Many years ago, however, electronic wheel balancers were made available to dynamically balance automotive and truck wheels. After the introduction of the electronic balancers, the after-market industry moved rapidly to embrace this solution as a corrective measure for vehicle vibration. Vehicle manufacturers subsequently adopted dynamic wheel balancing equipment for use at their factories.

A typical electronic wheel balancer sold for after-market use is a two plane machine which resolves the imbalance vector into a corrective state by determining through calculations what amount of weight should be placed on the wheel flanges. Because a tire and wheel that is perfectly dynamically balanced is known to be statically balanced, operators of these machines have tended to rely exclusively on the dynamic balanced readout in determining that the tire is balanced.

However, as will be explained more fully below, situations exist where the machine will indicate dynamic balanced, but some static imbalance will remain. In such circumstances, the tire may tend to hop up and down as the vehicle is driven. Moreover, automotive manufacturers have recently concentrated on making their chassis increasingly stiff to reduce problems associated with chassis flex. A stiffer chassis, however, exacerbates wheel imbalance as felt by vehicle occupants. As a result, a slight imbalance is more likely to be noticed by a vehicle occupant. The cause of this vibration may be extremely difficult for the service technician to ascertain because the balancer itself indicated perfect dynamic balance.

The construction and operation of exemplary prior art wheel balancers are described in U.S. Pat. No. 5,337,256 to Cunningham and U.S. Pat. No. 5,311,777 to Cunningham, both of which are incorporated herein by reference.

SUMMARY OF THE INVENTION

The present invention recognizes and addresses the foregoing disadvantages, and others, of prior art constructions and methods.

In one aspect, the present invention provides a method of balancing a vehicle wheel. One step of the method involves providing an electronic wheel balancer which simultaneously shows dynamic imbalance and static imbalance of a wheel to be balanced. At least one corrective weight is attached to the wheel to correct the dynamic imbalance. A residual static imbalance is then determined after attachment of the corrective weight. Finally, the corrective weight is adjusted to reduce the residual static imbalance.

According to another aspect, the present invention provides a wheel balancer for balancing a wheel. The balancer comprises a chassis and a driven shaft extending therefrom for rotating the wheel. A display is operative to simultaneously show dynamic imbalance and static imbalance of the wheel to be balanced.

Other objects, features and aspects of the present invention are provided by various combinations and subcombinations of the disclosed elements, as well as methods of utilizing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
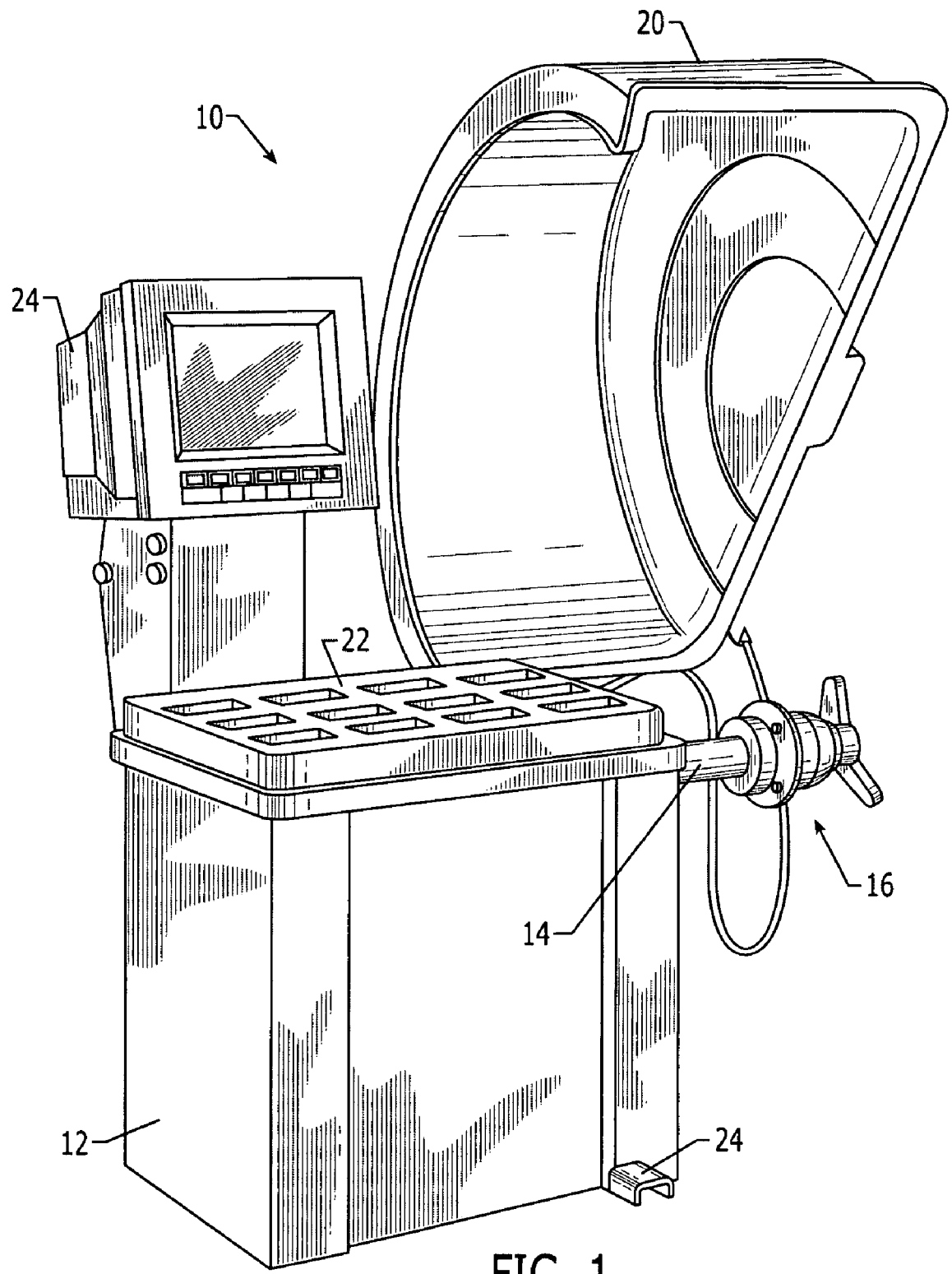
FIG. 1 is a perspective view of a wheel balancer of the type that may practice aspects of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 2:
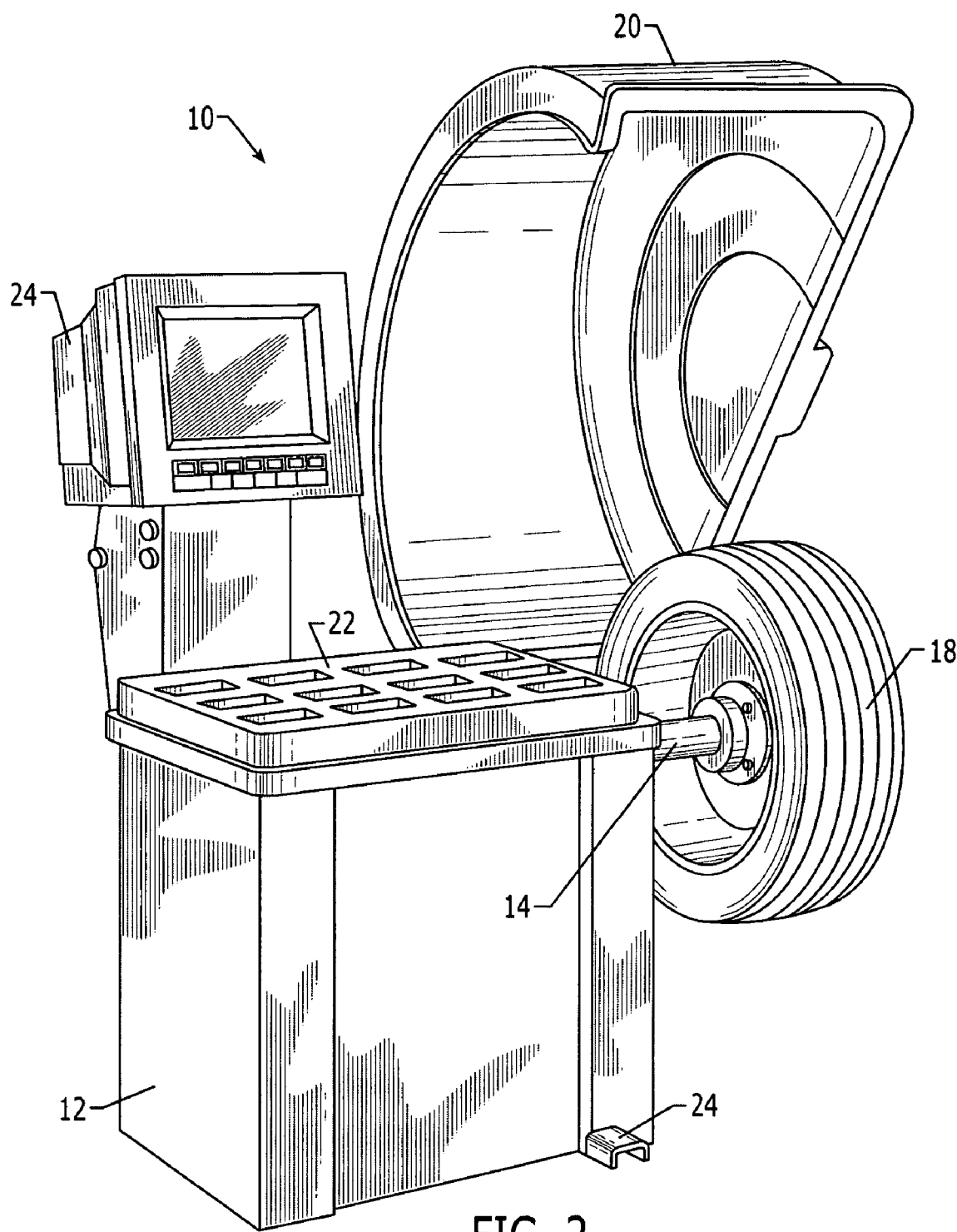
FIG. 2 illustrates the wheel balancer of FIG. 1 with a wheel to be balanced mounted thereon.

FIGS. 1 and 2 illustrate a wheel balancer 10 having a chassis 12 in which a drive motor is located. A rotatable shaft 14 driven by the internal motor extends from chassis 12 as shown. Generally, appropriate adapters, such as those indicated at 16, will be carried by shaft 14 to facilitate mounting of a wheel 18 to be balanced. Wheel cover 20 is pivotally connected to chassis 12 in such a manner that it can be lowered over wheel 18 before the balancing operation has commenced. A storage tray 22 mounted atop chassis 12 provides a convenient location for balancing weights or other objects. A foot pedal 24 is provided to hold the wheel position for application of balancing weights.

Figure 3:
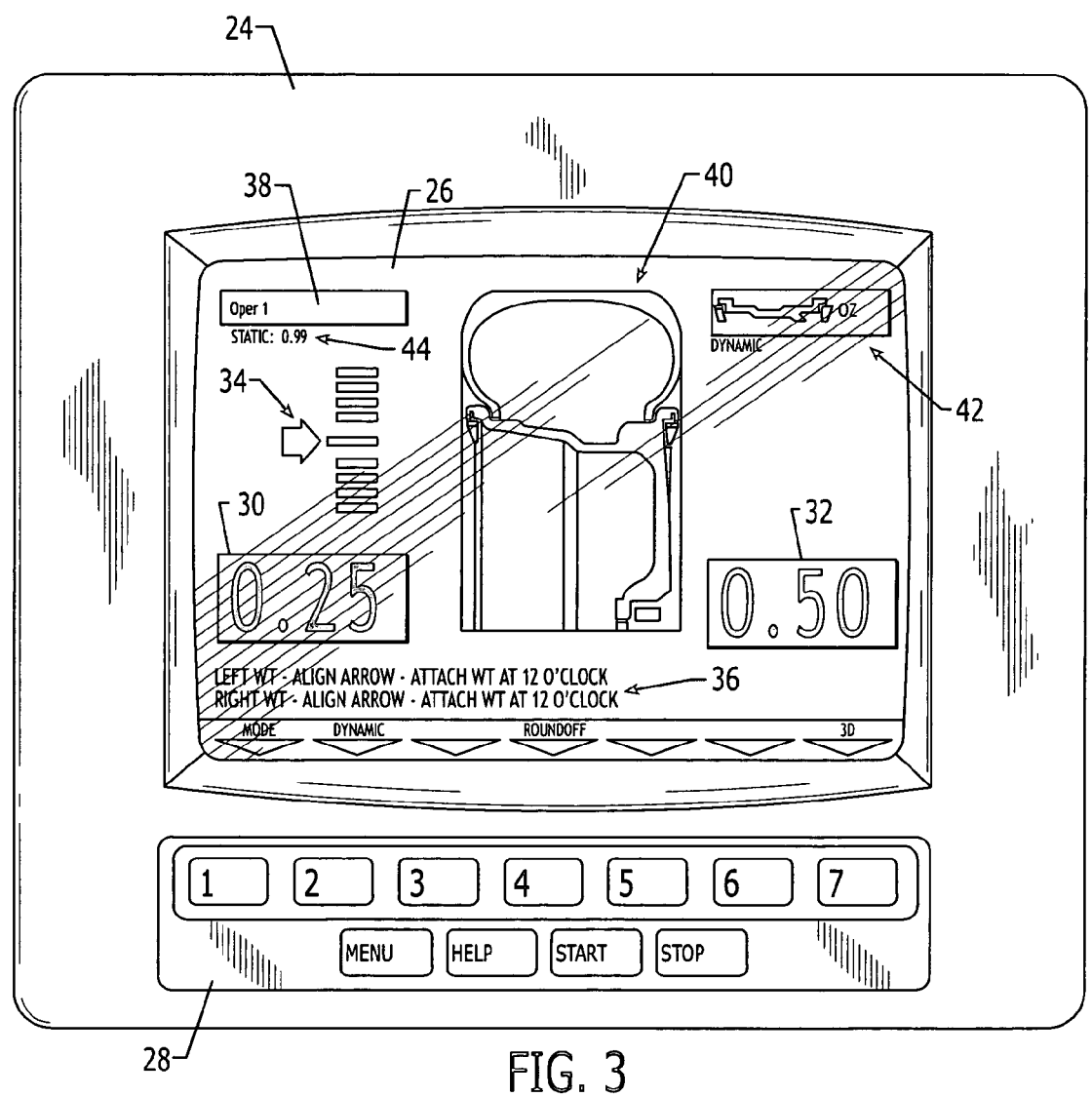
FIG. 3 illustrates an exemplary display that may be provided by the wheel balancer of FIG. 1 during use.

Referring now also to FIG. 3, balancer 10 further includes a display 24 used by the technician to control operation of the device. One skilled in the art will appreciate that any suitable type of display can be utilized for this purpose, such as flat panels and the like. In this embodiment, however, balancer 10 is equipped with a CRT-type display.

As shown, display 24 has a screen 26 on which various types of information can be displayed. A function bar 28 located below screen 26 has multiple push buttons that may be used by a technician for various purposes during the balancing operation. In this illustration, for example, button 1 corresponds to "Mode," button 2 corresponds to "Dynamic," button 4 corresponds to "Roundoff," and button 7 corresponds to function "3D." The various buttons of menu bar 28 thus provide user inputs to the processor within balancer 10.

In operation, the technician will cause balancer 10 to cycle (or "spin") in order to obtain data sufficient to perform a balancing calculation. In this regard, balancer 10 measures dynamic imbalance via sensors that generate signals indicative of the dynamic imbalance vector. In this case, balancer 10 is a two plane machine which resolves the imbalance vector into a corrective state by determining through calculations what amount of weight should be placed on the left and right flanges of the wheel. In FIG. 3, for example, the machine indicates that a weight of 0.25 ounces should be placed on the left flange and a weight of 0.5 ounces should be placed on the right flange (as shown in windows 30 and 32, respectively). As indicated by the icon 34 and the written instructions displayed at 36, each weight should be placed at the 12 o'clock position on the respective wheel flange.

Other graphical information is also provided on screen 26 to assist the technician. For example, the display indicates at 38 that the technician currently operating the machine is "Operator 1." In addition, graphical displays of the tire and wheel rim are provided at 40 and 42 to further assist the technician. For reasons that will be explained in more detail below, a continuous indication of static imbalance is also provided, as indicated at 44. In this case (before addition of the balancing weights), the display indicates a static imbalance of "0.99," maximum possible with 0.25 and 0.50 in round-off mode.

Figure 4:
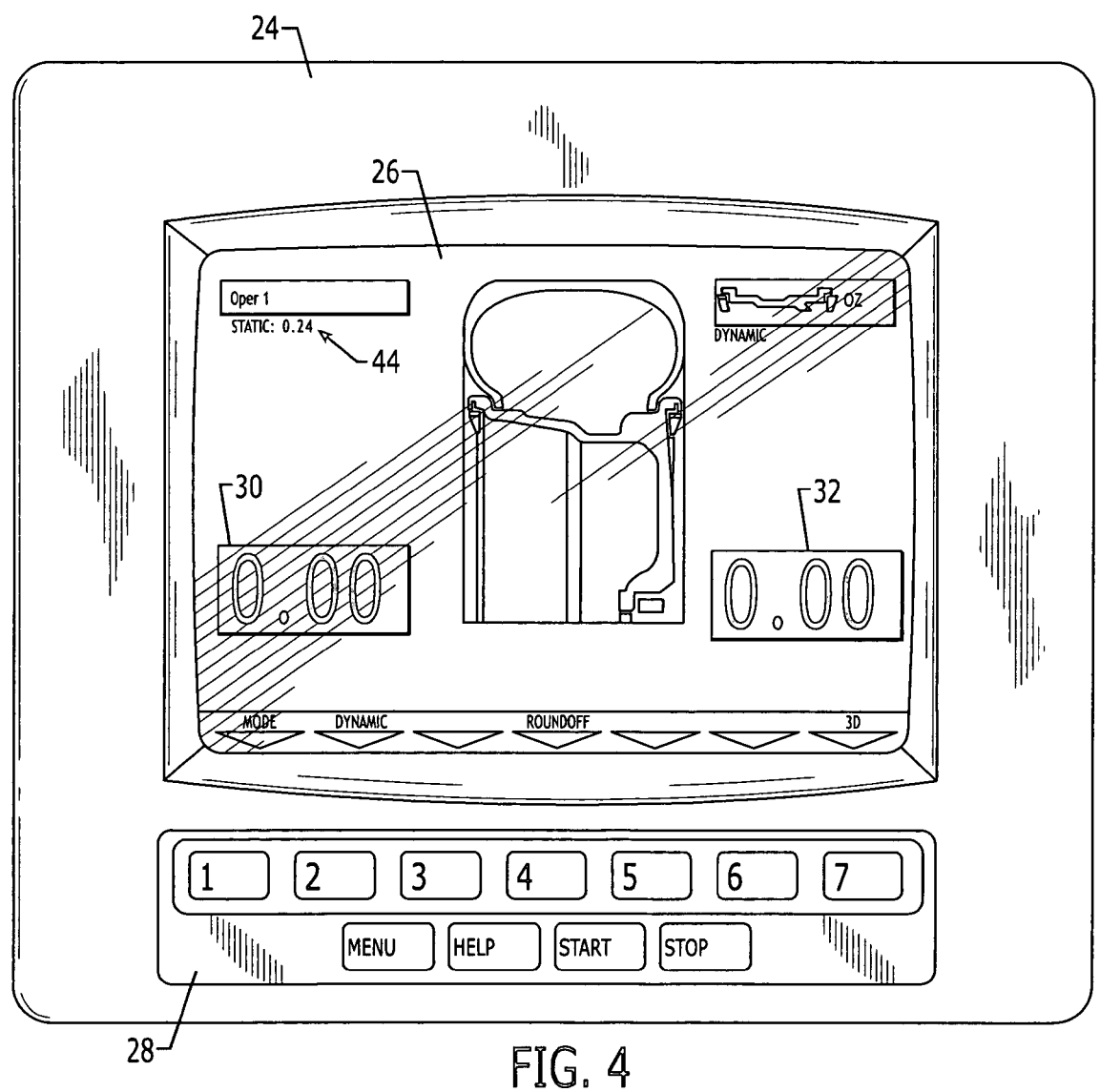
FIG. 4 is a view similar to FIG. 3 showing the display subsequent to cycling after balancing weights have been added.

FIG. 4 illustrates display 24 after addition of the balancing weights. In other words, the technician has added the designated balancing weights as instructed and then cycled the balancer again. At this point, windows 30 and 32 both display all zeroes, thus indicating that the wheel is dynamic balanced. It is noted, however, that the display continues to indicate a remaining static imbalance of 0.24. This appears contrary to the axiom that a tire and wheel that is perfectly dynamically balanced will be statically balanced. As discussed above, even a relatively small static imbalance such as this may often be felt by a vehicle occupant.

The reason for the apparent violation of the axiom relates to the manner in which a typical electronic wheel balancer is programmed to function. Specifically, the weight amounts to be added at left and right planes are rounded off to correspond to weight sizes that are available on the market. In the United States, for example, such weights are typically provided in quarter ounce increments. Thus, if the machine calculates that the corrective amount would be 0.37 ounce on the left plane and 0.62 ounce on the right plane, the machine is programmed to display 0.25 ounce left and 0.5 ounce right (see FIG. 3). This is because-the choices in pre-manufactured weights are available in increments of 0.25 ounce. Thus, the left weight is undersized by 0.12 ounce and the right weight is undersized by 0.12 ounce. However, if the machine is cycled with the correct weights attached, the machine will display 0.00 in both planes because this amount is below the round-up point (see FIG. 4).

In this example, if the attached corrective weights were almost radially aligned on the wheel across from each other, one would understand that an imbalance amount of 0.24 ounce still existed at or near one spot on the wheel. This amount of imbalance would manifest itself to the vehicle operator as a static imbalance, and the wheel would hop up and down during use. To correct this situation, balancer 10 has a constant display to the technician (as indicated at 44) showing the static imbalance in a non-round off mode along with the dynamic balance (as indicated at 30 and 32) whether rounded off or not. This feature allows the operator to make wheel weight position or weight amount adjustments to correct for the static imbalance.

Figure 5A:
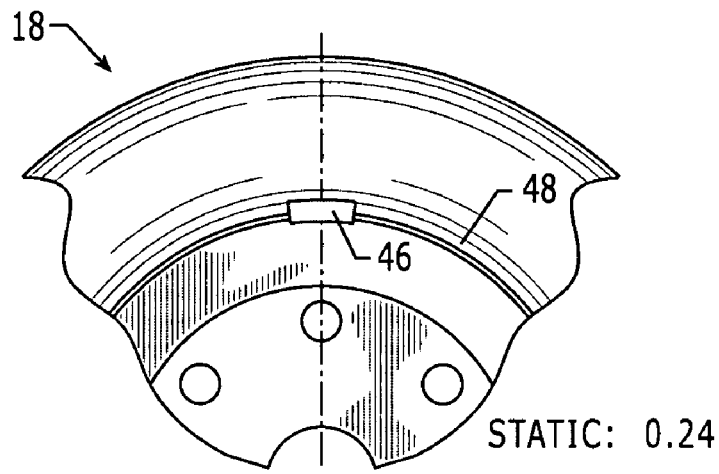
FIGS. 5A–5C illustrate minor adjustments to weight placement in order to minimize static imbalance.
Figure 5B:
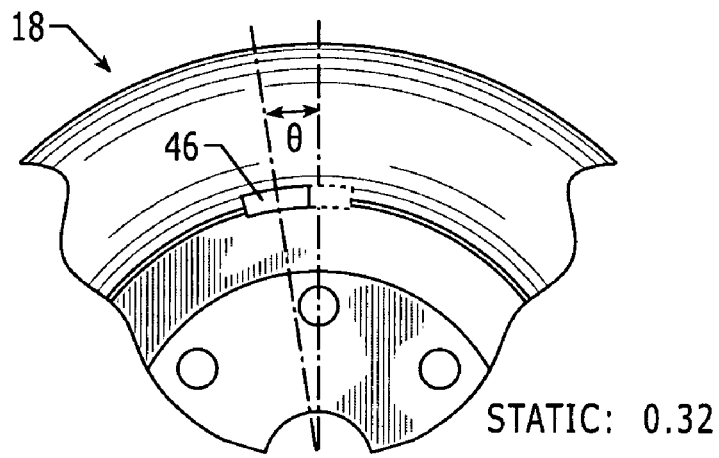
Figure 5C:
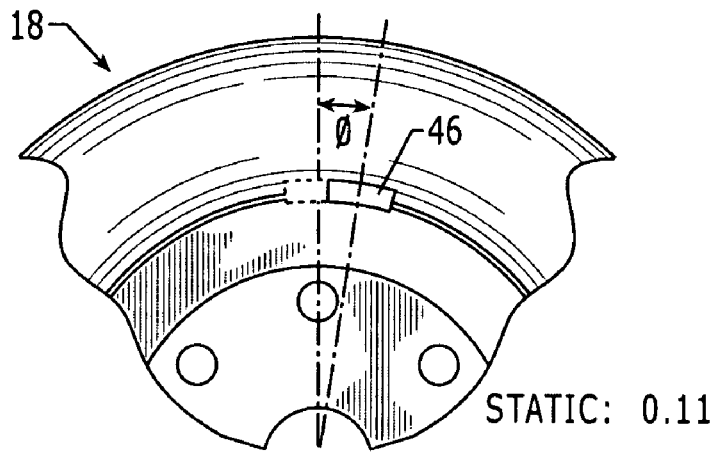

FIGS. 5A through 5C illustrate the method by which the technician can make minor adjustments to compensate for the residual static imbalance. In FIG. 5A, it can be seen that a balancing weight 46 is affixed at the 12 o'clock position on the rim flange 48 as instructed by the balancer display. As indicated, however, wheel 18 continues to exhibit a static imbalance of 0.24 even after balancer 10 indicates that dynamic balance has been achieved. To minimize this residual static imbalance, the operator can make minor adjustments to the positioning or size of weight 46 (or to the corresponding weight on the opposite flange).

For example, FIG. 5B indicates that the technician has shifted weight 46 by a small angle θ in the counterclockwise direction. Cycling of the wheel after this adjustment measures an actual static imbalance of 0.32, which is thus indicated on the display at 44. Thus, the technician will know that the adjustment has actually made static imbalance worse, rather than better as desired.

Referring now to FIG. 5C, the operator may then choose to shift the weight in the clockwise direction by a small angle φ. Subsequent cycling of wheel 18 with weight 46 in this position yields a static imbalance of 0.11. Because the static imbalance is considerably better than the original static imbalance of 0.24, the technician knows that he has improved ride quality for the customer. When the technician is confident that the lowest possible static imbalance has been achieved (with the balancer continuing to indicate a condition of dynamic balance), wheel 18 can be considered balanced for practical purposes.

It can thus be seen that the present invention provides a novel wheel balancing apparatus, as well as various novel methods of balancing a wheel. While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention.

What is claimed is:

1. A method of balancing a vehicle wheel comprising steps of:
   (a) providing an electronic wheel balancer which simultaneously shows dynamic imbalance and static imbalance of a wheel to be balanced;

(b) cycling said wheel to measure said dynamic imbalance thereof;

(c) attaching at least one corrective weight to said wheel to correct said dynamic imbalance;

(d) cycling again said wheel to measure an actual residual static imbalance after attachment of said corrective weight; and (e) adjusting said corrective weight to reduce said actual residual static imbalance.

2. A method as set forth in claim 1, wherein said corrective weight is adjusted in step (d) by moving said corrective weight slightly to a different position on said wheel.

3. A method as set forth in claim 1, wherein said corrective weight is adjusted in step (d) by trimming said weight to change the corrective weight's weight amount.

4. A method as set forth in claim 1, wherein said electronic wheel balancer shows dynamic imbalance by indicating a weight amount of said corrective weight and a position that said corrective weight should be mounted on said wheel.

5. A method as set forth in claim 4, wherein said electronic wheel balancer indicates weight amount and placement of at least two corrective weights in a first wheel plane and a second wheel plane, respectively.

6. A method as set forth in claim 1, wherein said electronic wheel balancer shows said dynamic imbalance in a round-off mode.

7. A method as set forth in claim 6, wherein weight amounts of said corrective weight is rounded off to the nearest 0.25 ounce.

8. A method as set forth in claim 6, wherein said electronic wheel balancer shows static imbalance in non-round-off mode.

9. A method as set forth in claim 2, wherein said different position is a different angular position on a plane transverse to a rotational axis of said wheel.

* * * * *